United States Patent [19]

Bezinque et al.

[11] Patent Number: 4,956,727

[45] Date of Patent: Sep. 11, 1990

[54] DISC MEMORY SERVO INDEXING SYSTEM

[75] Inventors: David J. Bezinque, Santa Cruz; James O. Jacques, Aptos, both of Calif.

[73] Assignee: Seagate Technology, Inc., Scotts Valley, Calif.

[21] Appl. No.: 308,931

[22] Filed: Feb. 6, 1989

Related U.S. Application Data

[63] Continuation of Ser. No. 07/31,764, Mar. 30, 1987, abandoned.

[51] Int. Cl.$^5$ ............................................. G11B 20/14
[52] U.S. Cl. .................................... 360/49; 360/40; 360/72.2; 360/78.14
[58] Field of Search ................. 360/72.2, 77.02, 78.14, 360/40, 48, 49, 50

[56] References Cited

U.S. PATENT DOCUMENTS

| | | | |
|---|---|---|---|
| 4,495,533 | 1/1985 | Chambers | 360/72.2 |
| 4,539,607 | 9/1985 | Fujiki | 360/78 |
| 4,682,253 | 7/1987 | Leslie | 360/78 |
| 4,737,869 | 4/1988 | Sugaya et al. | 360/77 |

*Primary Examiner*—Donald McElheny, Jr.
*Assistant Examiner*—David L. Robertson
*Attorney, Agent, or Firm*—Flehr, Hohbach, Test, Albritton & Herbert

[57] ABSTRACT

A servo disc in a magnetic disc drive has pulses recorded in frames in concentric data tracks. Each frame includes first and second sync pulse groups of at least one sync pulse each, a first track alignment signal (Quad) following the first sync group, and a second track alignment signal (Sig) following the second sync group. A Guard Band and a data Track Zero are identified by eliminating one sync pulse in selected members of frames. Circuitry including monostable multivibrator, flip-flops, and gates identify the Guard Band and Track Zero.

13 Claims, 4 Drawing Sheets

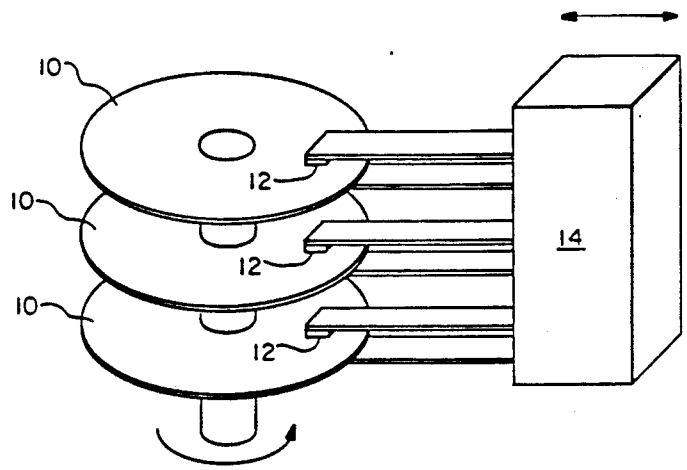
FIG.—1
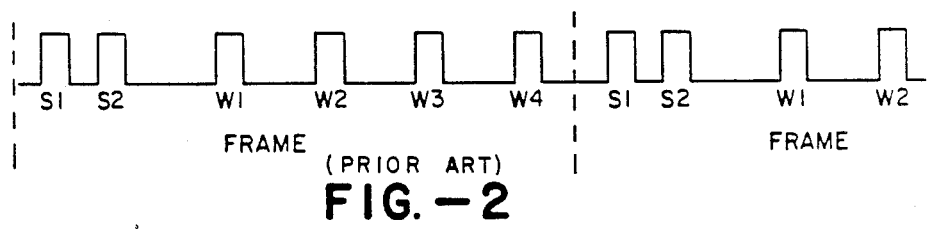
FIG.—2 (PRIOR ART)
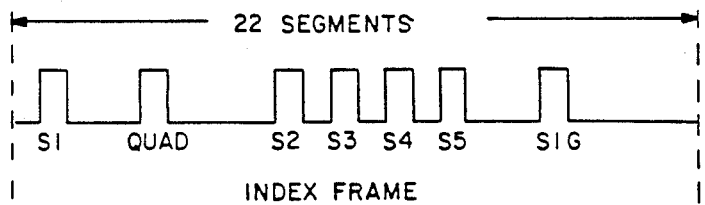
FIG.—3A
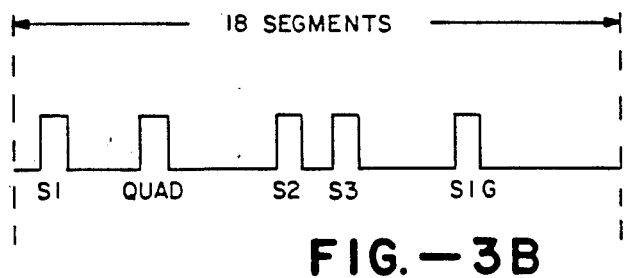
FIG.—3B

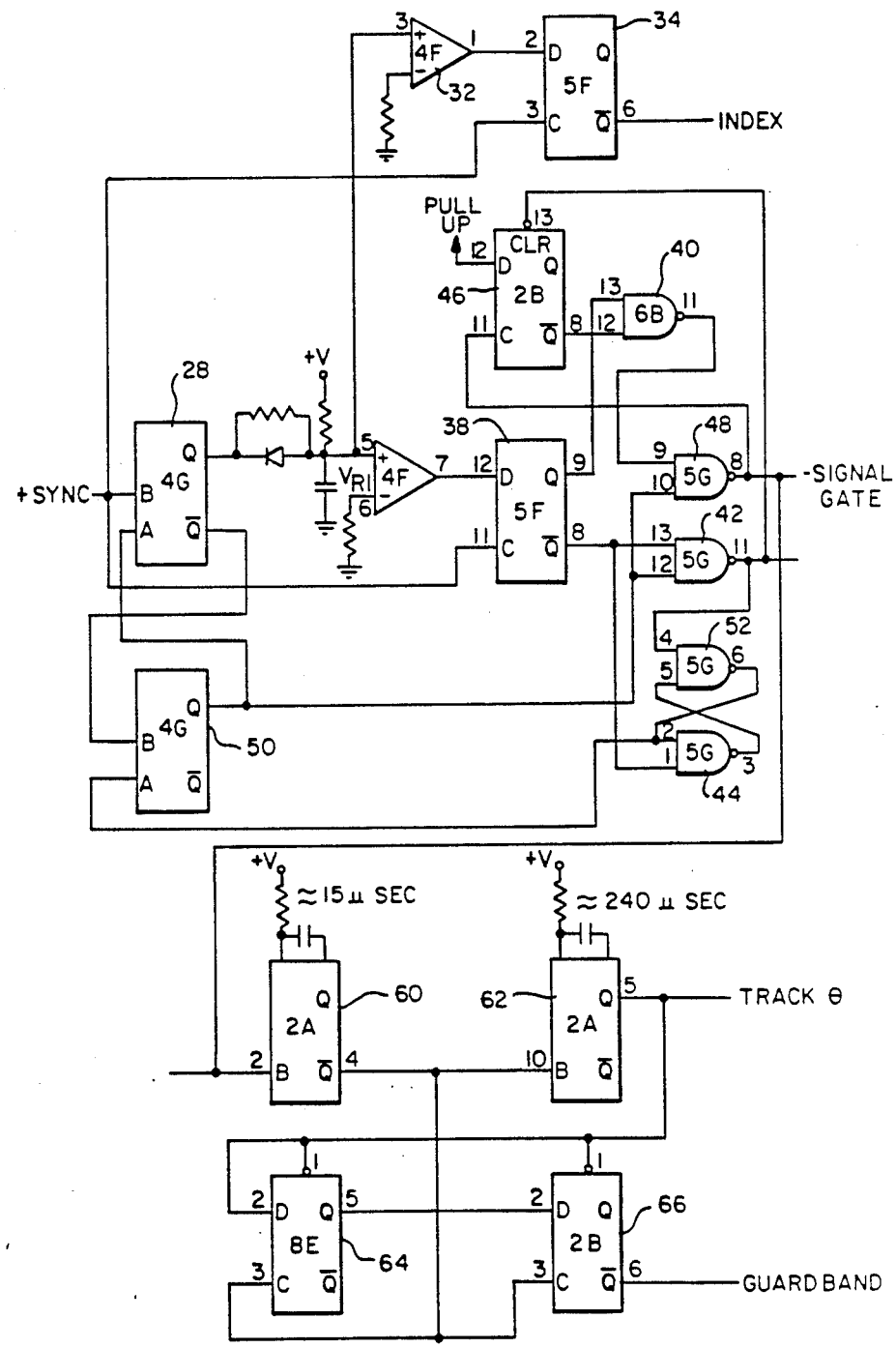
FIG.—4

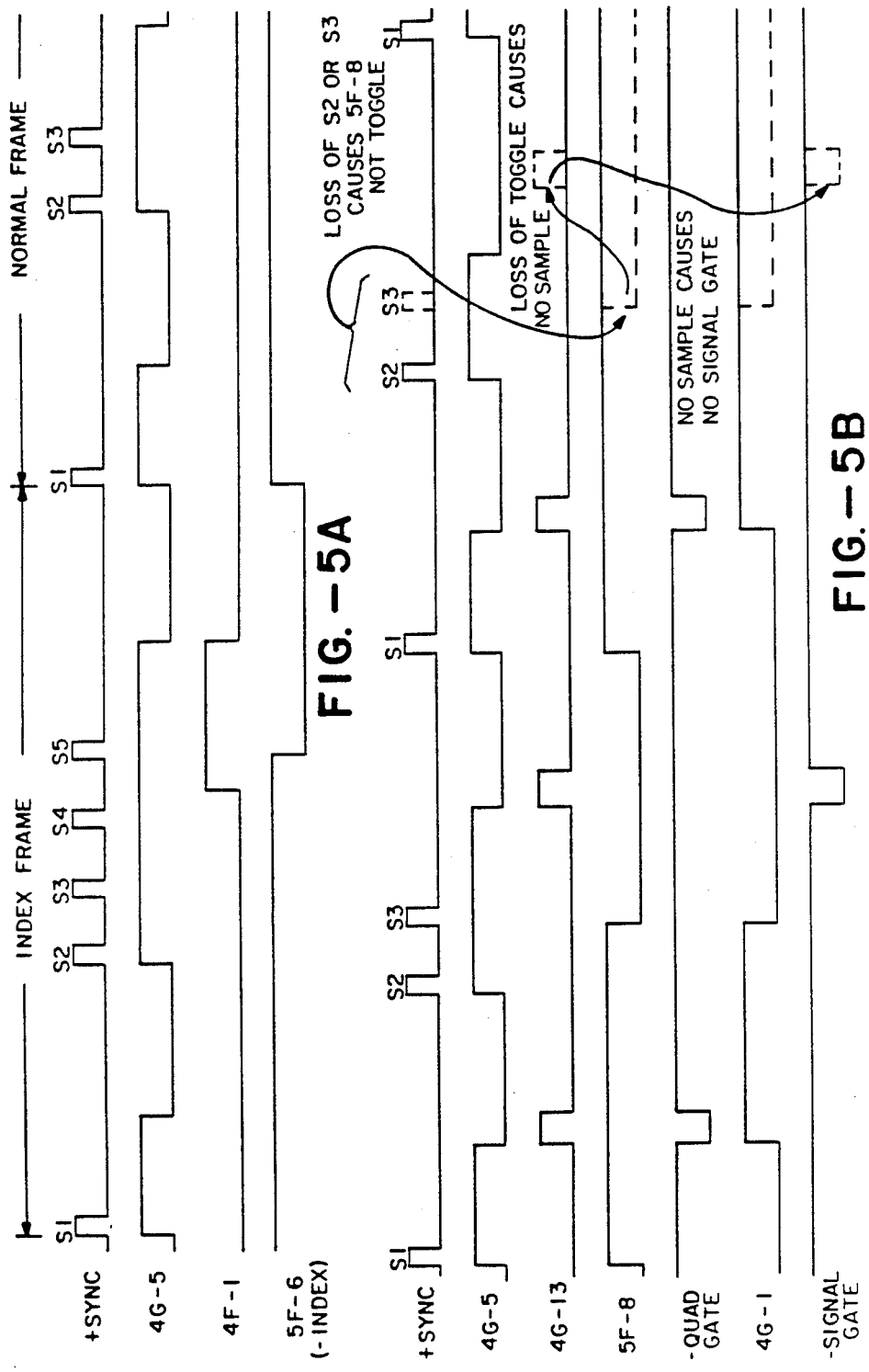

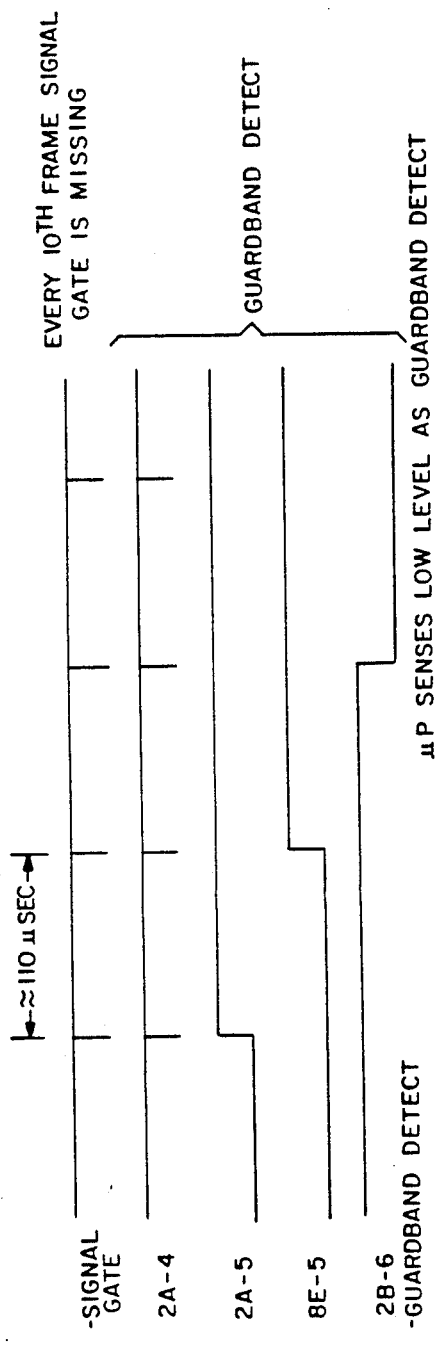
FIG.—5C
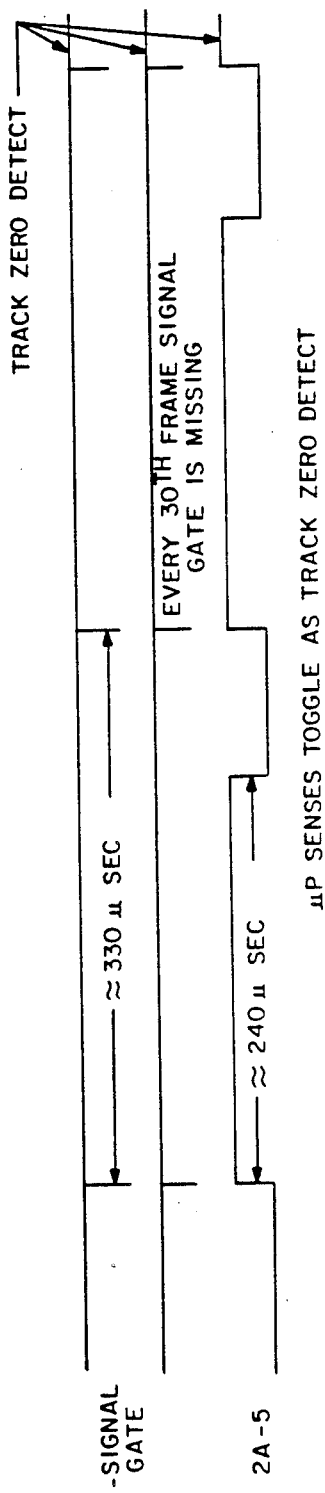
FIG.—5D

DISC MEMORY SERVO INDEXING SYSTEM

This is a continuation, of application Ser. No. 031,764 filed Mar. 30, 1987, now abandoned.

This invention relates generally to magnetic disc memory systems, and more particularly the invention relates to a servo indexing system in a magnetic disc memory.

The magnetic disc memory includes a plurality of discs mounted on a common spindle in spaced, parallel relationship. Data is magnetically recorded in magnetic coatings on the surfaces of the discs in concentric tracks. The data is recorded and accessed by pickup heads which move across the disc surfaces as the discs are rotated.

Typically, one surface of the disc surfaces is dedicated to servo control for the pickup heads. Data is recorded in the plurality of tracks which allow a dedicated servo control pickup head to identify Guard Bands at the inner and outer limits of the data tracks, a data Track Zero, and all other data tracks. Additionally, pulses are provided to permit accurate alignment of the pickup heads in each track.

The data in each track is arranged in frames. Typically, a first plurality of pulses in each frame are utilized to identify the status of the track and a second plurality of pulses are utilized for pickup head alignment. For example, the IBM 3350 disc drive utilizes two sync pulses at the beginning of each frame for encoding a bit of data and utilizes four additional pulses (Sig and Quad) for track alignment. The presence or absence of one of the two sync pulses determines the data bit as a "1" or a "0". U.S. Pat. No. 4,495,533 discloses a similar arrangement but reverses the order of sync pulses in encoding data allegedly for overcoming a problem of erroneous data readout when the rotational speed of the discs varies. The system also utilizes a crystal clock oscillator for circuit synchronization and control. The patent recognizes a problem of oscillator control when rotational speed varies, and the patent discloses a circuit for delaying selected clock pulses to maintain synchronization of the pulses with data being read from the servo track.

An object of the present invention is an improved servo indexing system.

Another object of the invention is a servo indexing system which does not require a crystal clock oscillator for timing and synchronization.

A feature of the invention is the use of timing circuitry in the form of gates, flip-flops and one-shot multivibrators for providing synchronization and track identification.

Briefly, two groups of one or more sync pulses are provided in each frame in the servo tracks which cause the generation of track alignment gate signals (Quad and Sig). Inhibiting generation of either the Quad or Sig gates once in a predetermined number of frames identifies the Guard Bands, Track Zero, and all other data tracks.

In a preferred embodiment, each frame includes a first sync pulse which causes generation of a Quad gate pulse, and second and third sync pulses which together cause generation of a Sig gate pulse. Absence of either of the second and third sync pulses inhibits generation of the Sig gate pulse. A Guard Band is identified by the absence of the Sig gate pulse once in every ten frames, and the Track Zero is identified by the absence of the Sig gate pulse once in every thirty frames. Importantly, the identification of the track by the absence of Sig gate pulses is accomplished by timing circuitry in the form of gates, flip-flops, and one-shot multivibrators.

The invention and objects and features thereof will be more readily apparent with the following detailed description and appended claims when taken with the drawings, in which FIG. 1 a perspective view illustrating a magnetic disc drive.

FIG. 2 is an illustration of servo signals in accordance with prior art.

FIGS. 3A and 3B illustrate servo signals in accordance with one embodiment of the present invention.

FIG. 4 schematic of circuitry responsive to the servo signals of FIGS. 3A and 3B for identifying a track index, a Guard Band, a, Track Zero, and all other data tracks.

FIGS. 5A and 5B, 5C and 5D illustrate the sequences of Sig gate pulses which identify Guard Band, Track Zero, and all other data tracks, respectively.

Referring now to the drawing, FIG. 1 is a perspective view illustrating a portion of a magnetic disc drive. The disc drive includes a plurality of discs 10 with the surfaces of the discs 10 having magnetic coatings for the recording of bits of data, e.g., "1" and "0". The bits of data are recorded on the surfaces in concentric tracks with the data grouped in frames of data words. The bits of data are recorded and accessed by means of magnetic heads 12 which are driven across the surfaces of the discs 10 by means of a carriage assembly 14 as the discs 10 are rotated.

As described above, one surface of one disc is typically dedicated to servo control of the carriage assembly and positioning of the pickup heads 12. Magnetic pulses are recorded in the frames of the tracks on the servo surface so that the location of the pickup head on a Guard Band or data track can be identified and also for proper positioning of the pickup head within a data track. As shown in FIG. 2, the pulse format of the IBM 3350, for example, includes two sync pulses S1 and S2, followed by four position pulses W1-W4 in each frame. The presence or absence of the first sync pulse, S1, encodes a bit of data with the bits of a plurality of sequential frames defining the Guard Band, Track Zero, or other data tracks. U.S. Pat. No. 4,495,533, supra, utilizes a similar pattern but utilizes the presence or absence of the second sync pulse, S2, for recording a data bit. The patent also teaches the use of a crystal controlled oscillator for timing in accessing the track position bits W1-W4 following the reception of the sync bits. According to the patent, this can lead to pulse identification problems when the oscillator is not synchronized with the rotational speed of discs.

In accordance with the present invention, a unique bit pattern is employed which can be accessed by unique circuitry without the requirement for a crystal controlled oscillator. The circuitry employs monostable one-shot multivibrators, flip-flops, and logic gates to identify a track index, Guard Band, and data tracks. As shown in FIG. 3A the index frame at the beginning of each track is 22 segments long and includes a first sync pulse S1 followed by a Quad pulse, and four sequential sync pulses S2-S5, which are followed by a Sig pulse. The Quad and Sig pulses are utilized for head alignment within each track. All other frames on the servo disc surface have a pattern as illustrated in FIG. 3B. Again, a first sync pulse S1 is followed by a Quad pulse, and then two sync pulses S2,S3 are followed by the Sig pulse. Circuitry is provided which responds to the sync pulses for generating gating signals at the proper time following the sync pulses for sampling the Quad and Sig pulses recorded on the servo disc surface. Additionally, the circuitry recognizes the four sequential sync pulses S2–S5 in the index frame and also recognizes a Guard Band, track 0 and other data tracks by the presence of the two sync pulses S2,S3 or the absence of either of the two sync pulses S2,S3 as shown in FIG. 3B.

FIG. 4 is a schematic diagram of one embodiment of the circuitry which responds to the sync pulses for generating Quad and Sig gate signals and also for generating index, Track Zero, and Guard Band detect signals. The detected sync pulses are applied to the B input of one-shot multivibrator 28 (4G) and also to the C inputs of the flip-flops 34 and 38 (5F). The one-shot output of multivibrator 28 (4G) passes through a charging circuit shown generally at 30 with the output of the charging circuit 30 applied to inputs of differential amplifiers 32 and 36 (4F). Output 1 of amplifier 32 (4F) is applied to the D input of flip-flop 34 (5F) and the $\overline{Q}$ output of flip-flop 34 (5F) is the index detect signal.

The output of charging circuit 30 is also applied to an input of differential amplifier 36 (4F), and the output 7 of amplifier 36 is connected to the D input of flip-flop 38. The Q output of flip-flop 38 is applied to one input of NAND gate 40 and the $\overline{Q}$ output of flip-flop 38 is applied to one input of NAND gate 42 and NAND gate 44.

The second flip-flop 46 has the C input connected to the output of a NAND gate 48 and the Q output of flip-flop 46 is connected to an input of NAND gate 40. The output of NAND gate 40 is connected to one input of NAND gate 48, and the output of NAND gate 52 is connected to the A input of one-shot multivibrator 50. The Q output of multivibrator 50 is connected to the A input of multivibrator 28 and to the inputs of NAND gates 42 and 48. The output of NAND gate 42 is connected to one input of NAND gate 52 with the output of NAND gates 52 and 44 cross-coupled as indicated.

A Sig gate signal is derived at the output of NAND gate 48, and a Quad gate signal is derived at the output of NAND gate 42. The Sig gate signal is connected to the input of a one-shot multivibrator 60 having a pulse duration on the order of 15 microseconds. The $\overline{Q}$ output of one-shot multivibrator 60 is connected to the input of a second one-shot multivibrator 62 which has a pulse duration of approximately 240 microseconds. The $\overline{Q}$ output of multivibrator 60 is connected also to the C input of flip-flop 64 and to the C input of flip-flop 66. The output of one-shot multivibrator 62 is connected to the D input of flip-flop 64, and the Q output of flip-flop 64 is connected to the D input of flip-flop 66. A Track Zero signal is derived at the output of one-shot multivibrator 62 in response to the absence of one of the sync pulses S2,S3, once every thirty frames, and a Guard Band detect signal is obtained at the $\overline{Q}$ output of flip-flop 66 in response to the absence of the sync pulse S3 once every ten frames. Presence of all three sync pulses S1, S2 and S3 for thirty frames indicates a data track other than Track Zero.

Consider now the timing diagrams of FIGS. 5A–5C in conjunction with the circuitry of FIG. 4. In FIG. 5A, the presence of four sync pulses S2–S5 in an index frame causes the output of flip-flop 34 (5F) to toggle as indicated in response to the positive voltage level on the D input of flip-flop 34 when the sync pulse S5 is applied to the C input of flip-flop 34. In the absence of the four sync pulses S2–S5, the $\overline{Q}$ output of flip-flop 34 (5F) remains at a positive voltage level.

FIG. 5B illustrates the inhibiting of a Sig gate pulse due to the absence of the S3 sync pulse in the format of FIG. 3B. As noted, flip-flop 50 normally toggles in response to the two sync pulses S2, S3. However, absence of sync pulse S3 results in no toggle of multivibrator 50 with the result that the Q output of flip-flop 38 remains high. With the Q output of flip-flop 38 high, the Sig gate signal at the output of NAND gate is inhibited.

The Sig gate signal is monitored, and absence of the Sig gate signal once in ten frames indicates Guard Band and absence of the Sig gate signal once in thirty frames indicates a Track Zero as shown in FIGS. 5C and 5D. Presence of the Sig gate in all frames is indicative of all other data tracks. In FIG. 5C, the inhibited gate signal appears as a negative pulse which is applied to the flip-flop 60 with the output of the flip-flop being a negative 15 microsecond pulse as illustrated in FIG. 5C. The 240 microsecond output of flip-flop 62 goes high and remains high in response to the recurring negative pulses every ten frames. The positive output of multivibrator 62 forces the output of flip-flop 64 to a high level, and the $\overline{Q}$ output of flip-flop 66 assumes a low level as an indication of Guard Band detect.

Referring to FIG. 5D, the absence of Sig gate pulse once in thirty frames allows multivibrator 62 to toggle since the 240 microsecond time period of multivibrator 62 is less than the 330 microsecond time period of the recurring negative Sig gate pulses. The toggling of multivibrator 62 is detected as a Track Zero signal.

The detection of the unique servo patterns by means of circuitry employing monostable one-shot multivibrators, flip-flops, and gating circuitry, in accordance with the invention, improves the accuracy and reliability of pulse detection in the servo pattern. Synchronization of an oscillator circuit with the rotational speed of the magnetic discs is obviated. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A servo disc in a magnetic disc drive comprising a plurality of data tracks and guard bands, each track and guard band including a plurality of frames, each frame including first pulse groups of at least one sync pulse which is used to generate a first track alignment signal (Quad) and second sync pulse groups of at least one sync pulse which is used to generate a second track alignment signal (Sig) and Index signal wherein said Sig and Index signal is generated by identifying different pulses patterns of said second sync pulse group, and wherein track identification is provided by selectively eliminating sync pulses in said second sync pulse group in a plurality of frames.

2. The servo disc as defined by claim 1 wherein a guard band is identified by eliminating one sync pulse of said second sync pulse group in a time period comprising a given number of said frames and a data Track Zero is identified by eliminating one sync pulse of said second sync pulse group in a time period comprising a different number of said frames.

3. A method of identifying guard band tracks and a data Track Zero in a disc surface comprising the steps of:
  providing magnetic pulses in a plurality of frames and each track on said disc surface, said magnetic pulses in each frame including first and second sync pulse groups of at least one sync pulse each;
  selectively eliminating sync pulses of said second pulse group in a plurality of frames in each track, the location of the eliminated sync pulse identifying said guard band track and said data track zero.

4. The method as defined by claim 3 wherein said step of selectively eliminating sync pulses of said second pulse group includes eliminating one sync pulse in a time period comprising a first number of frames for identifying a guard band, and eliminating one sync pulse in a time period comprising a second, different number of frames to identify a data Track Zero.

5. In a magnetic disc drive including a servo disc surface having magnetic pulses arranged in a plurality of frames in concentric tracks, each frame including first and second sync pulse groups of at least one sync pulse each, circuitry responsive to said sync pulses for generating signals identifying a track comprising:
  a first monostable one-shot multivibrator for generating a pulse in response to a sync pulse,
  charging circuitry means responsive to a plurality of sync pulses in one group to generate a trigger signal,
  means connecting said first monostable one-shot multivibrator to said charging circuit means,
  a first flip-flop circuit connected to said charging circuit means and responsive to said trigger signal for generating a first output signal,
  first logic gate means responsive to the presence of said output for generating a Sig gate pulse, and
  means responsive to periodic occurrence of said Sig gate pulse to identify a track, wherein said means responsive to periodic occurrence of said Sig gate pulse includes one-shot multivibrator circuitry responsive to omission of said Sig gate pulse once during a first time period to identify a guard band and responsive to omission of said Sig gate pulse during a second time period to indicate a Track Zero, the continued presence of said Sig gate pulse indicating all data tracks.

6. A disc in a magnetic disc drive comprising a plurality of data tracks and guard bands, each track including a plurality of frames, each frame including first pulse groups of at least one sync pulse, said sync pulse being used to generate a first track alignment signal (quad) and second sync pulse groups of at least one sync pulse which is used to generate a second track alignment signal (sig), the periodic absence of said second track alignment signal in one frame of a first predetermined plurality of said frames providing identification of alignment of said head on said data track.

7. A servo disc as claimed in claim 6 wherein the absence of said second track alignment signal in a periodically fixed frame of a second predetermined plurality of said frames identifying one of said guard bands.

8. A servo disc as claimed in claim 7 wherein said first predetermined plurality of frames comprises 10 frames, the sig pulse being absent from one of every 10 frames.

9. A servo disc as claimed in claim 7 wherein said second predetermined plurality of frames comprises approximately three times as many frames as said first predetermined plurality of frames.

10. A method of identifying guard band tracks and a data track zero on a disc surface comprising a steps of
  providing magnetic pulses on a plurality of frames on each track on said disc surface, said magnetic pulses in each frame including first and second sync pulse groups of said least one pulse each, a first track alignment signal (quad) being generated in response to the presence of said first sync pulse group, a second track alignment signal (sig) being generated by said second sync pulse group, and
  selectively eliminating a sync pulse in one frame in a first predetermined plurality of frames to inhibit generation of said second track alignment signal to selectively identify said data track or said guard band.

11. The method as defined in claim 10 wherein the step of selectively eliminating a sync pulse includes eliminating a sync pulse in said second pulse group in a first predetermined plurality of frames to identify a guard band, and in a second predetermined plurality of frames different from said first predetermined plurality to identify a data track.

12. The method as defined in claim 11 wherein said second predetermined plurality of frames is three times greater in number than said first predetermined plurality of frames.

13. The method as described in claim 12 wherein said first sync pulse group includes a single sync pulse, and said second sync pulse group includes at least two sync pulses, generation of said first and second track alignment signals being inhibited by the absence of either any one of said two or more sync pulses in said second sync pulse group.

* * * * *